(12) United States Patent
Chu

(10) Patent No.: US 8,796,401 B2
(45) Date of Patent: Aug. 5, 2014

(54) POLYMERIZATION OF HIGH VISCOSITY MATERIALS

(75) Inventor: Yi-Lin Chu, Hsinchu (TW)

(73) Assignee: Princo Middle East FZE, Dubai (AE)

( * ) Notice: Subject to any disclaimer, the term of this patent is extended or adjusted under 35 U.S.C. 154(b) by 394 days.

(21) Appl. No.: 13/225,767

(22) Filed: Sep. 6, 2011

(65) Prior Publication Data

US 2012/0065355 A1 Mar. 15, 2012

(30) Foreign Application Priority Data

Sep. 10, 2010 (EP) .................................... 10176192

(51) Int. Cl.
*C08F 2/01* (2006.01)
*C08G 64/24* (2006.01)
*B01J 19/18* (2006.01)

(52) U.S. Cl.
USPC .............. 526/65; 528/196; 422/134; 366/316

(58) Field of Classification Search
USPC ......... 525/53; 526/65, 88; 528/196; 366/316; 422/134
See application file for complete search history.

(56) References Cited

U.S. PATENT DOCUMENTS

| 3,440,019 A * | 4/1969 | Scheller et al. ................ 422/134 |
| 5,932,683 A | 8/1999 | Hachiya et al. |
| 6,630,563 B2 | 10/2003 | Hucks et al. |
| 2001/0007014 A1 * | 7/2001 | Kinoshita et al. ............. 528/196 |
| 2007/0159919 A1 | 7/2007 | Kim et al. |
| 2007/0171767 A1 | 7/2007 | Huang |

FOREIGN PATENT DOCUMENTS

| DE | 1557063 B1 | 9/1973 |
| DE | 10322106 A1 | 11/2004 |
| EP | 1760105 A1 | 3/2007 |
| EP | 1760106 A1 | 3/2007 |
| EP | 1760107 A1 | 3/2007 |
| EP | 1760108 A1 | 3/2007 |
| EP | 1760109 A1 | 3/2007 |
| SU | 1187838 A1 | 10/1985 |

OTHER PUBLICATIONS

Search Report for EP 10176192.2 mailed Mar. 14, 2011.

* cited by examiner

*Primary Examiner* — Fred M Teskin
(74) *Attorney, Agent, or Firm* — Marshall, Gerstein & Borun LLP

(57) ABSTRACT

The present invention relates to a new polymerization process which is suitable for polymerizing high molecular weight products of high viscosity such as polycarbonates and polystyrenes in reasonable time. The present invention achieves the above-identified object by means of a polymerization process, wherein at least in the final stages of the polymerization reaction, two different types of mechanical mixing means are employed as alternatives, designated first and second mixing means. The first mixing means do generate new surfaces in the material to be treated by means of mechanical mixing and by means of gravity driven mixing, while the second mixing means do generate new surfaces in the material to be treated not by means of mechanical mixing and only by means of gravity driven mixing.

14 Claims, 6 Drawing Sheets

POLYMERIZATION OF HIGH VISCOSITY MATERIALS

CROSS-REFERENCE TO RELATED APPLICATIONS

This application claims the benefit of European Patent Application No. EP 10176192.2, filed Sep. 10, 2010.

The present invention relates to a new polymerization process.

BACKGROUND OF THE INVENTION

Many polymerization reactions involve the processing of high viscosity materials. For Example, the viscosity of a molten polycarbonate is high, and it is therefore difficult to remove foreign matter from the polycarbonate. It is, furthermore, typically required that new surfaces are constantly generated during the processing of such high viscosity materials, for example, in order to allow evaporation of by-products of the polymerization reaction (such as during the manufacture of a polycarbonate), in order to allow the evaporation of unreacted monomers (such as during the manufacture of polystyrene based materials), as well as in order to achieve a good mixing of all components (inherently achieved when generating the surfaces), or in order to allow a further completion of the polymerization reaction (an example again would be the manufacture of polystyrene based polymers or polycarbonates).

Various types of polymerization reactors have been developed for such processes, involving typically either mechanical agitation of highly viscous reaction mixtures, such as in horizontal twin-screw reactors, or static mixers which utilize gravity to achieve effective surface renewal and the mixing of highly viscous compositions, such as falling-film-evaporators. Examples of such polymerization reactors and processes employing same are disclosed in U.S. Pat. No. 5,932,683 as well as in European patent applications EP 1 760 105 A1, EP 1 760 106 A1, EP 1 760 107 A1, EP 1 760 108 A1 and EP 1 760 109 A1.

However, these conventional approaches towards the processing of highly viscous polymerization compositions have several drawbacks. Polycarbonate resins for example, when produced with twin-screw reactors typically show discoloration and poor stability because of the high shear rates and corresponding high temperature conditions during the processing in the twin-screw reactor. In addition, due to the high viscosity, it is difficult to produce high molecular weight products.

The processes employing reactors utilizing only gravity to achieve effective surface renewal and the mixing of the highly viscous polymerization materials are disadvantageous due to the fact that high retention times are required, decreasing the economic value of such polymerization processes.

U.S. Pat. No. 6,630,563 discloses a process of producing highly viscous polymers using a reactor consisting of rotatable cylindrical baskets having a cylindrical perforated wall and discs positioned along the periphery of the basket. During the process, the reactor is partially filled with the molten reaction mixture. The perforated structures are drawn through the melt by means of rotation, so that once the perforated structures emerge again from the melt, they do provide the possibility for the adhering melt to flow downward in order to produce a continuous film enabling surface renewal.

However, even this process still does not allow a highly satisfactory handling of highly viscous polymerization compositions.

SUMMARY OF THE INVENTION

Accordingly, the present invention is concerned with the object of providing a polymerization process for highly viscous polymeric materials, such as polycarbonates, overcoming the drawbacks associated with the prior art. In particular, it is the object of the present invention to enable the preparation of high molecular weight products of high viscosity in reasonable time.

The present invention achieves the above-identified object by means of the polymerization process as identified in claim 1. Further preferred embodiments are defined in the subclaims as well as the following specification.

Accordingly, the present invention relates to a process for the preparation of high viscosity polymeric materials, wherein at least in one stage of the process a combination of first and second mixing means is employed, wherein the first mixing means do generate new surfaces in the material to be treated by means of mechanical mixing and by means of gravity driven mixing, while the second mixing means do generate new surfaces in the material to be treated not majorly, preferably not, by means of mechanical mixing and mostly, preferably only, by means of gravity driven mixing.

The expression "mechanical mixing" as used in the present application is intended to designate a means mixing of the polymeric material, wherein a shear force is exerted to the polymeric material by means of deflection. The deflection of the polymeric material can be caused by deflecting blades or a rotating disc which are integrated in the first mixing means. Preferably the entire polymeric material passing the mixing means is deflected. The expression "gravity driven mixing" as used in the present invention is intended to designate a means of mixing the polymeric material, wherein a shear force is exerted to the material only by means of the spin force of the second mixing means, and the material is deflected only to a small extent. Accordingly, the second mixing means will preferably not comprise any deflection blades or a rotating disc.

The inventors did achieve to overcome the drawbacks associated with the prior art by providing a process for preparing a high molecular weight polymer, such as a polycarbonate, wherein at least in the final stages of the polymerization reaction, two different types of mechanical mixing means are employed as alternatives, designated first and second mixing means.

The first mixing means employed in the process in accordance with the present invention can be suitably employed during those stages of the manufacture of a high molecular weight polymer where the viscosity is in a range of up to about 150,000 cP at 300° C. for plural arrangement, while the second mixing is typically is employed during a later stage of the manufacturing process where the viscosities are up to about 400,000 cP or higher at 300° C. for plural arrangement.

The mixing means to be employed in accordance with the present invention can be utilized in reactors having a horizontal arrangement as well as in reactors having a vertical arrangement, with the latter being preferred (horizontal and vertical designating the general flow direction of the polymeric material). Of course it is also possible to combine vertical and horizontal mixing means in any desired manner.

DETAILED DESCRIPTION OF THE INVENTION

Vertical Reactor
First Mixing Means

The first mixing means typically is a mixing means providing for the generation of new surfaces and good mixing of the components by means of mechanical mixing, however, with a minimum input of shear to the material processed. Preferred embodiments comprise a rotating disc and wires being present above the disc, extending from the center of for example a rotating shaft, to the outer edge of the disc. Typically, the wires extend out to the outer periphery of the disc. The number of wires for this first mixing means can be selected appropriately. Typical numbers for wires are from 5 to 20. The wires typically contact the disc at the outer periphery and extend then in a desired way upwards towards a point upwards of the center of the disc. The ratio of wire diameter to diameter of the disc is preferably within the following range: $1/80 < d/D < 1/200$, more preferably $1/60 < d/D < 1/130$, where d is the diameter of the wire, and D is the diameter of the disc.

One or more of these mixing means can be employed in a process in accordance with the present invention.

Second Mixing Means

The second mixing means typically employed for the higher viscosity section of the polymerization reaction, typically corresponds to the first mixing means with the exception that no or minimum shear force originating from mechanical mixing is exerted, i.e. the second mixing means preferably act by means of gravity only. Accordingly a rotating disc typically is not provided, i.e. typically, the second mixing means has cylindrical bases that comprise only wires extending from a central portion of the cylindrical bases to the outer periphery of the cylindrical bases. Again, the form of the wires as well as the number of wires can be selected as indicated above for the first mixing means. Typically, the wires in the second mixing means again extend from the outer periphery of the cylindrical bases upwards towards a point being upwards of the central portion of the cylindrical base. If desired, the wires may further have a second end, extending in a horizontal manner from the outer periphery of the cylindrical bases to the central portion of the cylindrical bases. The ratio of wire diameter to diameter of the basis formed by the wires is preferably within the following range: $1/80 < d/D < 1/200$, preferably $1/60 < d/D < 1/130$, where d is the diameter of the wire, and D is the outer diameter of the cylindrical base.

Typically, first mixing means as well as second mixing means for the vertical reactor are designed in a manner allowing the incorporation of a rotating shaft through the center of the mixing means, in order to allow the provision of various first and second mixing means in a vertical reactor arranged at different positions upon rotating shafts. Suitable examples of such vertical reactors comprise one or more first mixing means and one or more second mixing means, such as four first mixing means and four second mixing means, for example arranged (from top to bottom) in the order of first mixing means followed by the second mixing means. This order may however be reversed and it is also possible to employ alternating orders of first and second mixing means.

Due to the arrangement of the first and second mixing means in a vertical reactor, it is possible to produce in a highly reliable and satisfactory manner high molecular weight polymeric materials, such as polycarbonates. Using a vertical reactor for first and second mixing means, it is for example possible, with a residence time of preferably from 20 to 40 minutes, in an arrangement containing 5 to 10 mixing means, to produce high molecular weight polycarbonates having a number average molecular weight of over 12,000. By further adjusting the polymerization conditions as well as by increasing the number of first and second mixing means, it is also possible to further increase the number average molecular weight above for example, a value for a polycarbonate of up to and more than 20,000. Vertical reactor types typically are employed for low number-average molecular weight polymer feed-ins, typically in the range of 4,000 to 10,000, so that the vertical type reactor then enables the increase of the number-average molecular weight from the feed-in number-average molecular weight to highly satisfactory final molecular weight of more than 20,000, and in certain embodiments up to 25,000 or more.

Due to the specific process control, employing first and second mixing means it is possible to minimize the detrimental effects of shear, as encountered in prior art processes employing extruders. At the same time the present invention allows to reduce residence times as compared to conventional processes using gravity driven devices, such as the known falling-film-evaporators.

Horizontal Reactor

The present invention also contemplates horizontal reactors for manufacturing and processing polymeric materials of high viscosity. Typically, horizontal reactors, compared to vertical reactors, allow a higher feed-in molecular weight, such as expressed by a number average molecular weight. For polycarbonates, the feed-in number average molecular weight may be 10,000 or more, i.e. substantially higher than a typical feed-in number-average molecular weight for a vertical reactor.

Also in the horizontal reactor, the present application contemplates the use of two different mixing means. One typical example is an extruder type mixing means, wherein parts of the extruder screw do further show bars or rods being arranged parallel to the central axis of the screw, which are responsible for the generation of new surfaces, while the remaining parts of the extruder screw, not showing such rods or bars mainly are responsible for transporting the material through the extruder. Normally, the process is carried out in such a modified extruder with a low filling of molten material, so that a high void volume is provided. Preferably, the filling of such an extruder only provides a filling so that the upper boundary of the molten material contacts the lowest part of the extruder screw.

In another embodiment of a horizontal reactor, the extruder screw comprises over the whole length additional bars or rods being arranged substantially parallel to the central axis of the screw without any other parts present.

Also with such a horizontal configuration which is possible in accordance with the present invention to provide high molecular weight polymeric material of high viscosity in a highly satisfactory yield and quality.

Polymeric Materials

With the process of the present invention any high viscosity material can be manufactured, in particular any kind of polycarbonate materials, including homopolymers and copolymers, as well as styrene based polymers, including again homopolymers and as copolymers. Preferably the process of the present invention is employed for the preparation of high quality polycarbonates, such as materials employed for CD's etc.

BRIEF DESCRIPTION OF THE DRAWINGS

The invention is now illustrated with reference to the following drawings, where.

The proposed object has been achieved by the reactor devices which continuously form free film under the gravity and mixing means and have a high film-forming rate. The film forming rate is defined as the ratio of the amount of material per unit time which is drawn up by the paddles and flows downwardly in the form of a free film, to the total throughput of the reactor. This film-forming rate has been higher than 15.

Figure 1:
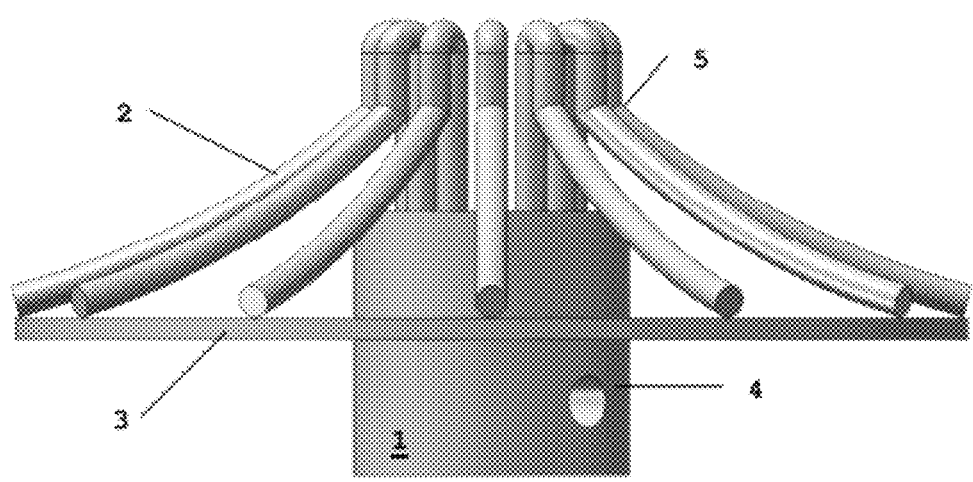
FIG. 1 illustrates a first mixing means according to the present invention.

Referring now to FIG. 1, there is shown a first mixing means 1 according to an embodiment of the present invention. Said first mixing means 1 comprises a rotating disc 3 and wires 2. Wires 2 are present above the disc, extending from the center of a rotatable shaft 4, to the outer periphery of rotating disc 3. Wires 2 contact the rotating disc 3 at the outer periphery thereof, and extend then in a curved way upwards towards a bend 5, then straight upwards to a point upwards of the rotating shaft 4, and then in another curve downwards and straight to a point on the rotating shaft 4. In the present embodiment can be varied, in particular the curved and bend structure of the wire can be altered, as will be readily appreciated by a person skilled in the art. For example, wire 2 can extend upwards in a curved way directly to a point upwards of the rotating shaft 4, without a bend 5, and then downwards to a point on the rotating shaft 4, or alternatively, upwards in a straight way with 0, 1 or more bends 5 to a point upwards to a point upwards of the rotating shaft 4, without a curve, and then downwards to a point on the rotating shaft 4. As already stated, number and thickness of the wire 2 are adjusted according to the requirements of the reaction. Typical numbers for wires 2 are from 8 to 2, and the ratio of wire 2 diameter to diameter of the rotating disc 3 is preferably within the following range: $1/80 < d/D < 1/200$, more preferably $1/60 < d/D < 1/130$, where d is the diameter of the wire, and D is the diameter of the disc.

Figure 2:
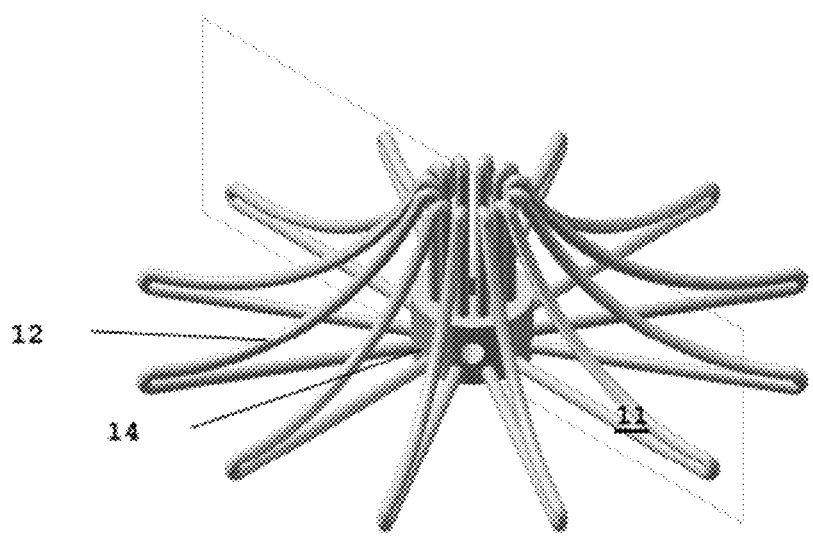
FIG. 2 illustrates a second mixing means according to the present invention.

Referring now to FIG. 2, there is shown a second mixing means 11 according to another embodiment of the present invention. Said second mixing means 11 has a cylindrical basis that is formed of wires 12 extending from a portion of a rotating shaft 14. Again, the form of the wires 12 as well as the number of wires 12 can be selected as indicated above for the first mixing means. The ratio of wire 12 diameter to diameter of the basis formed by wires 12 is preferably within the following range: $1/80 < d/D < 1/200$, preferably $1/60 < d/D < 1/130$, where d is the diameter of the wire, and D is the outer diameter of the cylindrical base.

Figure 3:
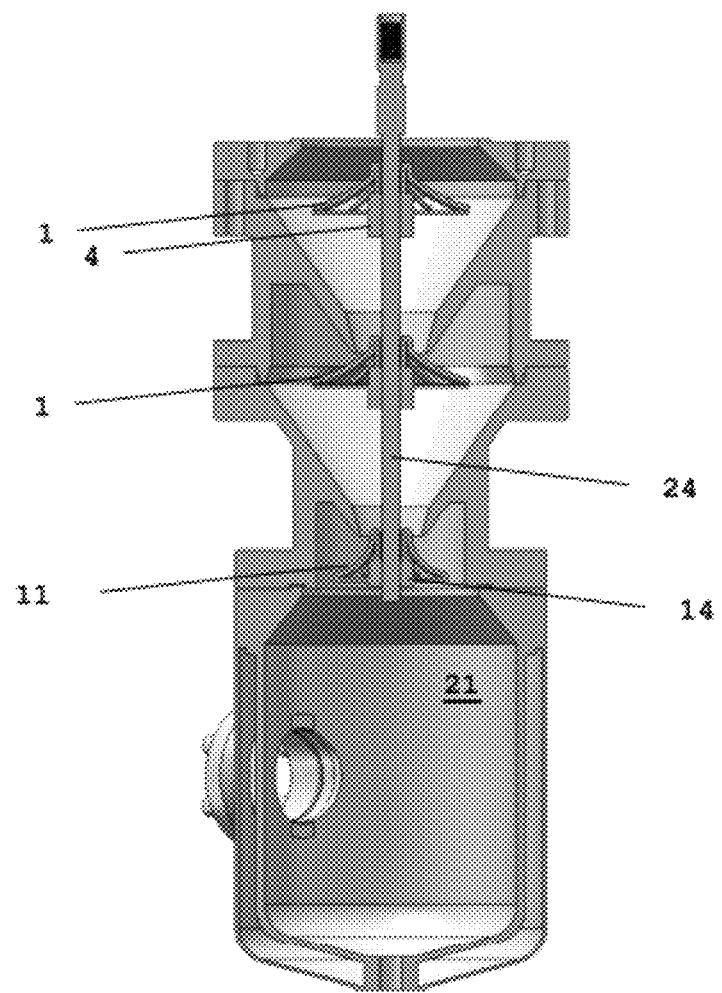
FIG. 3 is a schematic view of a vertical arrangement according to a first embodiment of the present invention comprising two consecutive first mixing means and one second mixing means (3-layer arrangement)

Referring now to FIG. 3, there is shown a vertical reactor 21 according to a first embodiment of the present invention incorporating a rotating shaft 24 through the center of the mixing means 1 and 11, respectively. According to the embodiment of FIG. 3, the vertical reactor comprises two first mixing means 1 and one second mixing means 11. This order may, however, be reversed and it is also possible to employ alternating orders of first and second mixing means.

Figure 4:
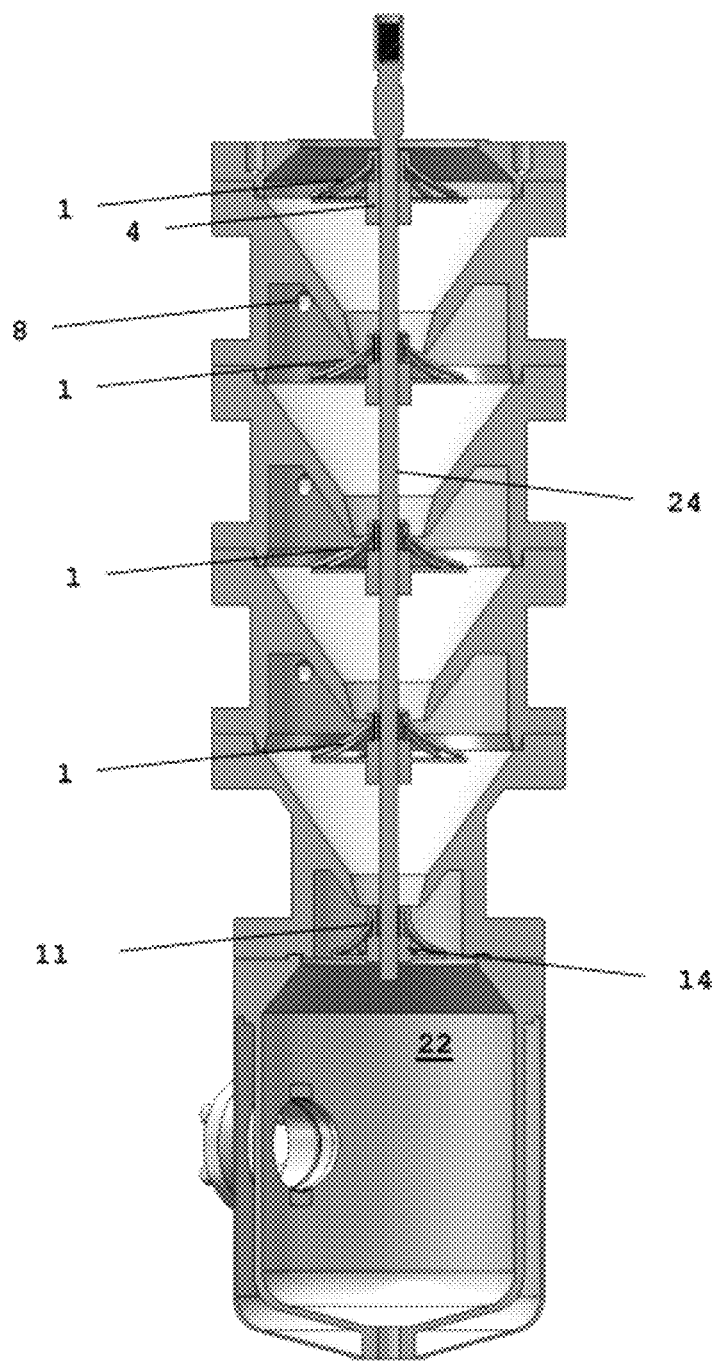
FIG. 4 is a schematic view of a vertical arrangement according to a second embodiment of the present invention comprising four consecutive first mixing means and one second mixing means (5-layer arrangement)

Referring now to FIG. 4, there is shown a vertical reactor 22 according to a second embodiment of the present invention incorporating a rotating shaft 24 through the center of the mixing means 1 and 11, respectively. According to the embodiment of FIG. 4, the vertical reactor comprises four first mixing means 1 and one second mixing means 11. This order may, however, be reversed and it is also possible to employ alternating orders of first and second mixing means. As can be seen from FIG. 4, the reactors may contain additional inlets 8 for providing additional products into the reactor.

Both the spacing between the several mixing means arrangement and the size of the mixing means may be made proportional to the melt viscosity that varies along the height/length of the vertical reactor and both the spacing and the size of the mixing means increase with the increased viscosity of the polymer from the inlet side to the outlet side of the reactor. Preferably, about 3 to 12, more preferably 5 to 8 mixing means are fitted per meter of the reactor length.

The reactor is fed via the feed nozzle at the end face of the reactor with low-molecular weight oligomeric product which, after condensing in the reactor to form polymeric resin that is removed via outlet nozzle.

The reactor is empty at the beginning. After being continuously fed with the low-molecular weight oligomeric product and rotation begins, the melt is spin drawn through the rotating mixing means, flows downward and forms the continuous stretching film which, thus, enables evaporation of the relevant monomers.

The temperature differences between heating means and product in the reactor may be reduced to prevent expedient heating and product damage on the walls of the reactor. This is because the product is mostly processed by the mixing means and gravity and has least heat interference from the wall of the reactor.

The processing temperatures for polycondensation are generally between 240 to 320° C., preferably 260 to 300° C., the pressure between 0.001 to 10 mbar, preferably 0.01 to 5 mbar and the mean residence times 15 to 200 minutes, preferably 25 to 120 minutes.

The vapors formed in the course of condensation are guided off upwardly via the vapors outlets.

Figure 5:
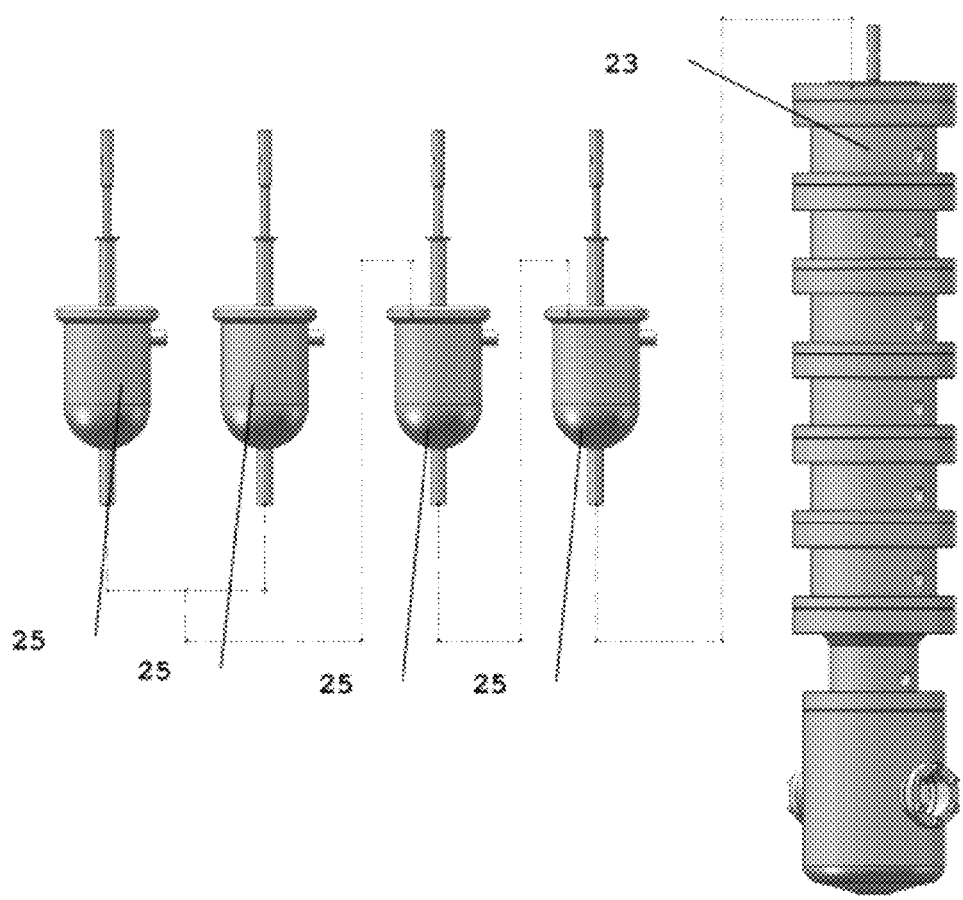
FIG. 5 is a process flow diagram according to a third embodiment according to the present invention for the production of polycarbonates including four autoclaves, and one reactor comprising first and second mixing means connected, in series.

Referring now to FIG. 5, there is shown a process flow diagram according to a third embodiment according to the present invention for the production of polycarbonates. The process including four autoclaves 25, and one vertical reactor 23 comprising first and second mixing means (not shown).

It has surprisingly been found that the use of the reactor device according to the present invention is particularly well suited for industrial production of polycarbonates of very high quality from oligocarbonates of the autoclaves type produced, for example, by transesterification of diaryl carbonates with dihydroxyaryl compounds in the presence of catalysts. The very good color qualities of the polycarbonates obtained are particularly surprising.

The melt transesterification process proceeds in a known manner from dihydroxyaryl compounds, diaryl carbonates and optionally branching agents and/or monohudroxyaryl compounds.

The reactor features a mechanical and gravity enhanced process to form the free film, it surpasses the simple gravity method in film foaming rate. On the other hand, the reactor also contains the advantages of very low shear stress in processing the polymeric resins.

Figure 6:
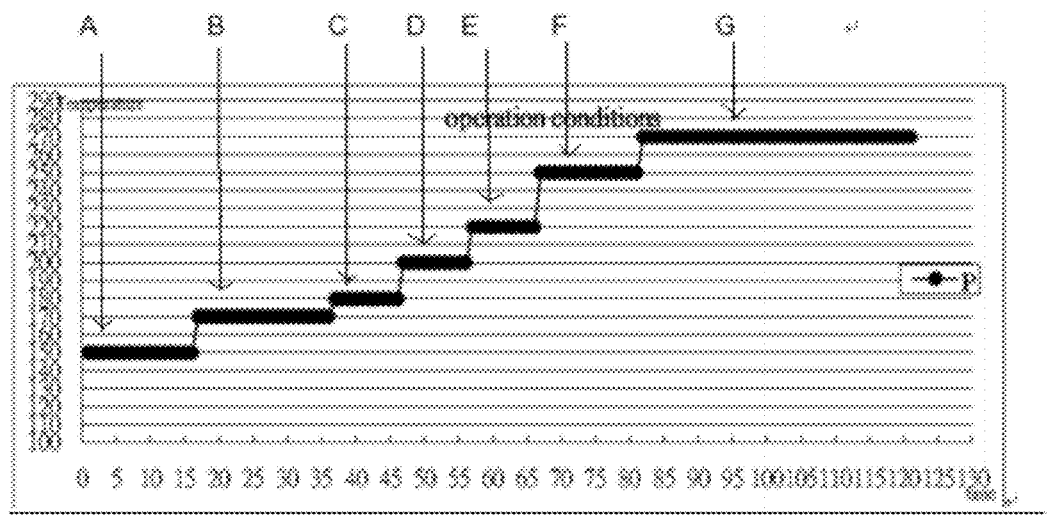
FIG. 6 illustrates typical operation conditions in polycarbonate production according to a fourth embodiment according the present invention including six autoclaves, and one reactor comprising first and second mixing means connected, in series.

Typical operation conditions in polycarbonate production are illustrated as in FIG. 6. Reactors A, B, C, D, E, and F can be regarded as one of more autoclaves operation in different temperatures and pressures, which are connected in series, to produce oligocarbonates. Reactor G is the proposed invention with designated mixing means which is also connected in series after the autoclaves to produce high molecular weight polycarbonates.

It has been found that a particularly preferred autoclave device for polycondensation of oligocarbonates is a horizontal cylindrical container with a stirrer.

In principle, polycondensation of the oligocarbonate may be carried out in one reactor. However, it may be expedient to arrange two or more reactors in succession as the final molecular weight to be attained is determined by the reaction equilibrium which depends on the temperature, pressure and the terminal group contents of the polycarbonates. At insufficient pressures the monomers to be drawn off may scarcely be condensed or may not be condensed at all and this leads to expensive, over-size vacuum systems. However, the advantage of low pressures is that the reaction temperature which, in conjunction with the residence time, determines quality, may be reduced. By distribution, for example, between two reactors, the gas exposure, minimized by different pressures and optionally by partially condensation of cleaved and evaporated compounds, the vacuum systems and the heat exposures of the product may be optimized. The molecular weight level of the starting oligomer and the amounts, yet to be evaporated, of products to be cleaved to the final molecular weight is also significant here.

For the progress of the reaction and the quality of the product obtained, it is advantageous to divide the reactor into a plurality of preferably vertically disk-shaped zones which may be heated separately from one another, so a temperature profile adapted to the molecular weight trend may be allowed. The heat exposure of the polycarbonate may therefore be minimized and this generally has a positive effect on the properties such as color of the polycarbonate. To this end, heating of the sections of the reactor may advantageously be horizontally separated accordingly.

The term "oligocarbonates" in the context of the present invention refers to condensates with a relative viscosity between 1.02 and 1.25, preferably between 1.05 and 1.10. The relative viscosity is shown as the quotient of the viscosity of the solvent and the viscosity of the oligomer dissolved in this solvent. It has been determined in dichloromethane at a concentration of 5 g/l at 25° C.

The polycarbonates obtainable by the process according to the invention have relative viscosities of 1.16 to 1.40, preferably 1.18 to 1.32. The relative viscosity is shown as the quotient of the viscosity of the solvent and the viscosity of the oligomer dissolved in this solvent. It has been determined in dichloromethane at a concentration of 5 g/l at 25° C.

To modify the properties of the polycarbonates, auxiliaries and reinforcing agents may be added to the oligocarbonates prior to synthesis to high molecular polycarbonates, the invented reactor can be served as an plastic additives feeder and mixer. Examples of these include: heat and UV stabilizers, flow promoters, mould-release agents, flame retardants, low molecular carbonic acid esters, halogen compounds, salts, chalks, quartz powder, glass and carbon fibers, pigments and combination thereof.

When reactor is applied in process G at lower temperature, i.e. a temperature between melting point and the glass transition temperature of the oligocarbonate, it serves as reactor for solid state polymerization. Polymerization of polycarbonate is performed by first enhancing the crystallinity of a precursor polycarbonate, such as an oligomer, by contact form with a solvent enhancer, and then conducting solid state polymerization in a stream of inert gas such as nitrogen. The mixing means according to the present invention help making crystalline oligomer, heating at a constant temperature range of about 200~240° C., optionally combined with a first heating stage of about 160~200° C. The mixing means reactor according to the present invention is adaptable to continuous operation and produces a polycarbonate having a number average molecular weight, as determined by gel permeation chromatography relative to polystyrene, of at least 15,000.

Figure 7:
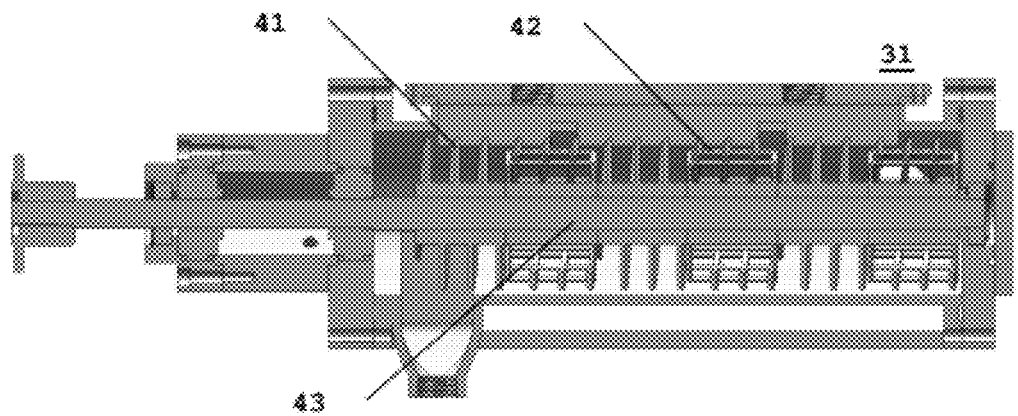
FIG. 7 is a schematic view of a horizontal arrangement according to a fifth embodiment of the present invention.
Figure 8:
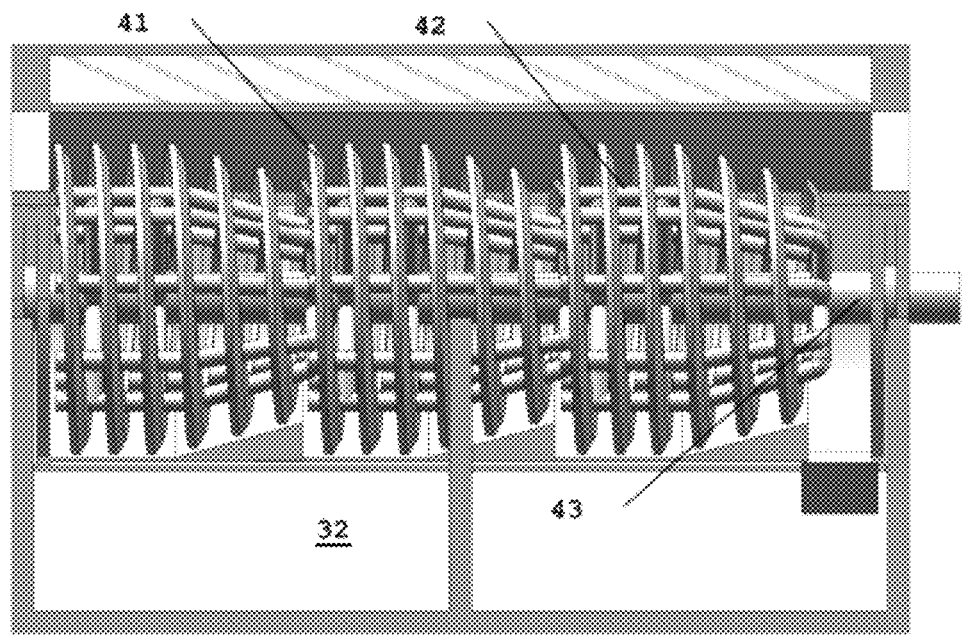
FIG. 8 is a schematic view of a horizontal arrangement according to a sixth embodiment of the present invention.
Figure 9:
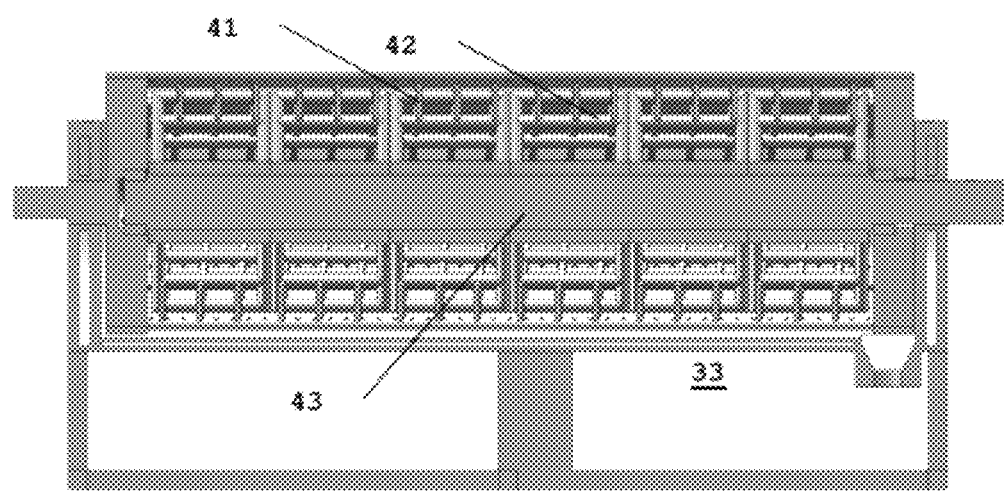
FIG. 9 is a schematic view of a horizontal arrangement according to a sixth embodiment of the present invention.

FIGS. 7, 8 and 9 are a schematic view of a horizontal reactor 31, according to a fifth, 32 according to a sixth, and 33 according to a seventh embodiment of the present invention, respectively. All horizontal reactors 31, 32 and 33 comprise an extruder type mixing means 41, wherein parts of the extruder screw do further show bars or rods 42 being arranged parallel to the central axis 43 of the screw 41. Bars or rods 42 are responsible for the generation of new surfaces, while the remaining parts of the extruder screw 41, not showing such rods or bars 42 mainly are responsible for transporting the material through the extruder. In embodiments according to FIGS. 8 and 9 of a horizontal reactor 32 and 33, respectively, the extruder screw 41 comprises over the whole length additional bars or rods 42 being arranged substantially parallel to the central axis 43 of the screw 41 without any other parts present.

The invention claimed is:

1. Process for the preparation of a high viscosity polymeric material, wherein at least in one stage of the process a combination of first mixing means and second mixing means is employed, wherein the first mixing means comprises a rotating disk and wires, said wires being present above the rotating disk, and extending from the center of a rotating shaft, to the outer edge of the rotating disk, wherein the second mixing means has a cylindrical basis that is formed of wires extending from a portion of the rotating shaft to the outer periphery of the cylindrical basis, and wherein the second mixing means does not comprise a rotating disk.

2. Process according to claim 1, wherein a plurality of first mixing means and second mixing means are employed.

3. Process according to claim 1 wherein the first mixing means and second mixing means are arranged in alternating order.

4. Process according to claim 1 wherein the first mixing means and second mixing means are arranged so that the material to be treated passes in a vertical manner through the first mixing means and second mixing means.

5. Process according to claim 1 wherein the high viscosity polymeric material is a polycarbonate.

6. Process according to claim 1 wherein the feed in number average molecular weight of the material to be treated is 5,000 or more.

7. Process according to claim 1 wherein the number average molecular weight of the material exiting the at least one first mixing means is 10,000 or more.

8. Process according to claim 1 wherein the final number average molecular weight of the polymeric material exiting the combination of at least one first and at least one second mixing means is 15,000 or higher.

9. Process according to claim 1 wherein the first mixing means and second mixing means are arranged so that the material to be treated passes in a horizontal manner through the first mixing means and second mixing means.

10. Process according to claim 9 wherein the feed in number average molecular weight of the material to be treated is 10,000 or more.

11. Process according to claim 2 wherein the first mixing means and second mixing means are arranged in alternating order.

12. Process according to claim 2 wherein the first mixing means and second mixing means are arranged so that the material to be treated passes in a vertical manner through the first mixing means and second mixing means.

13. Process according to claim 2 wherein the feed in number average molecular weight of the material to be treated is 5,000 or more.

14. Process according to claim 2 wherein the number average molecular weight of the material exiting the at least one first mixing means is 10,000 or more.

* * * * *